Figure 1:
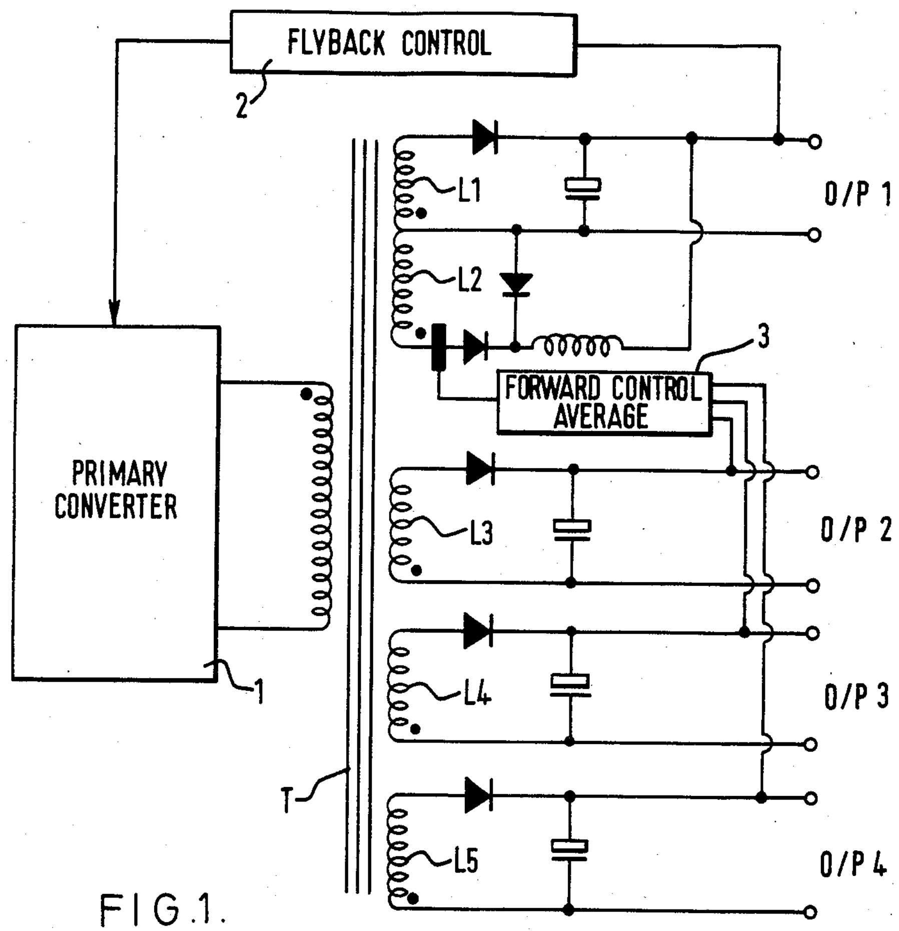

United States Patent [19]

Cross et al.

[11] Patent Number: 4,745,538

[45] Date of Patent: May 17, 1988

[54] ELECTRICAL POWER SUPPLIES

[75] Inventors: Bryan N. Cross; Andrew D. B. Wheele, both of N. Devon, England

[73] Assignee: Coutant Electronics Limited, Devon, England

[21] Appl. No.: 846,558

[22] Filed: Mar. 28, 1986

[30] Foreign Application Priority Data

Mar. 28, 1985 [GB] United Kingdom ................ 8508064

[51] Int. Cl.[4] ............................................ H02M 3/335

[52] U.S. Cl. ........................................ 363/21; 363/25; 363/97

[58] Field of Search .................................. 363/15-17, 363/20-26, 65, 90, 91, 97

[56] References Cited

U.S. PATENT DOCUMENTS

| | | | |
|---|---|---|---|
| 3,935,526 | 1/1976 | Kamata et al. | 363/21 |
| 4,209,826 | 6/1980 | Priegnitz | 363/21 |
| 4,374,355 | 2/1983 | Steigerwald et al. | 363/21 X |
| 4,481,565 | 11/1984 | Colton | 363/21 X |
| 4,581,690 | 4/1986 | Russell | 363/17 |

*Primary Examiner*—Patrick R. Salce
*Assistant Examiner*—Emanuel Todd Voeltz
*Attorney, Agent, or Firm*—Lowe, Price, LeBlanc, Becker & Shur

[57] ABSTRACT

A switched-mode power supply having a main output (O/P1) and one or more other outputs (O/P2, O/P3 and O/P4), wherein the outputs are regulated both by flyback control and forward control and wherein the power supply includes a transformer (T) having a primary winding, a main output winding (L2) and one or more other output windings (L3, L4 and L5), a primary converter (1) associated with the primary winding, a forward conversion circuit (S1, T, D2, D3, $L_H$ and C1) associated with the main output winding (L2) for supplying the main output (O/P1), one or more flyback conversion circuits associated with the other output winding or windings (L3, L4 and L5) for supplying the other output or outputs (O/P2, O/P3 and O/P4), a forward control circuit (4) connected to the forward conversion circuit and arranged to control the main output (O/P1) in response to a signal derived from one or more of the other outputs (O/P2, O/P3 and O/P4), and a flyback control circuit (2) connected to the primary converter (1) and arranged to control the other output or outputs (O/P2, O/P3 and O/P4) in response to a signal derived from the main output (O/P1). In an alternative arrangement, a further main output winding (L1) is provided in a flyback conversion circuit arranged to control the forward control circuit (4).

17 Claims, 3 Drawing Sheets

FLYBACK CONTROL
2
L1
O/P 1
L2
3
FORWARD CONTROL AVERAGE
PRIMARY CONVERTER
L3
O/P 2
1
L4
O/P 3
T
L5
O/P 4 while switches S1*a* and S1*b* are open, this energy having been stored magnetically in the transformer while switches S1*a* and S1*b* are closed. (Hence), primary converter 1 may be considered as providing flyback conversion.) Winding L1 serves to smooth the provision of energy to the output and hence may reduce the size of inductor $L_H$ and/or capacitor C1. Winding $L_1$ may be omitted. Outputs O/P2, O/P3 and O/P4 are provided with flyback energy only, provided in a similar manner to that of output O/P1.

The flyback control circuit 2 controls the duty cycle of switches S1*a* and S1*b* to maintain output O/P1 at a constant voltage. The forward control average circuit 4 controls switch $S_2$ to maintain the average of outputs OP/2, OP/3 and O/P4 at a constant level. There may be any number (including one) of flyback type outputs.

Figure 4:
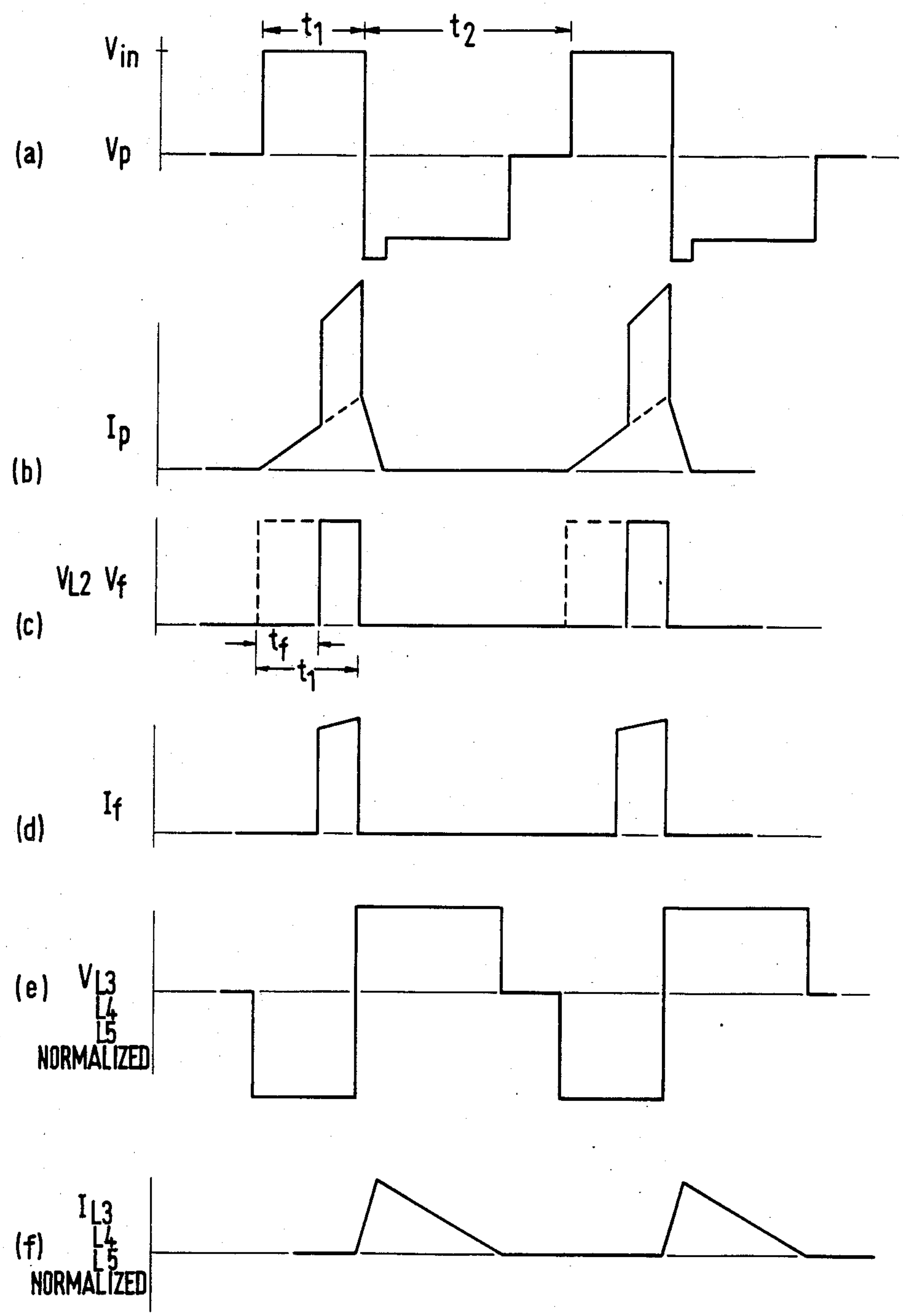
Figure 2:
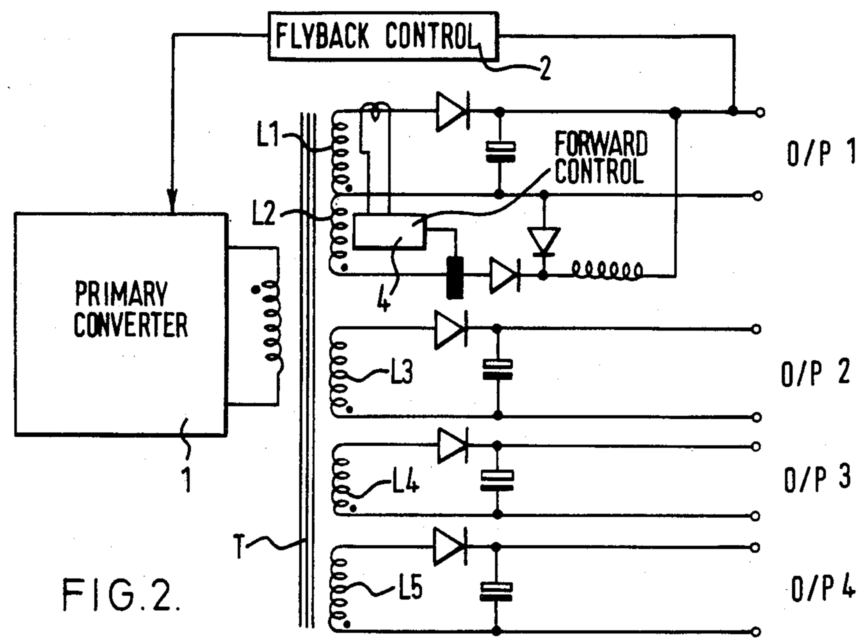
Figure 3:
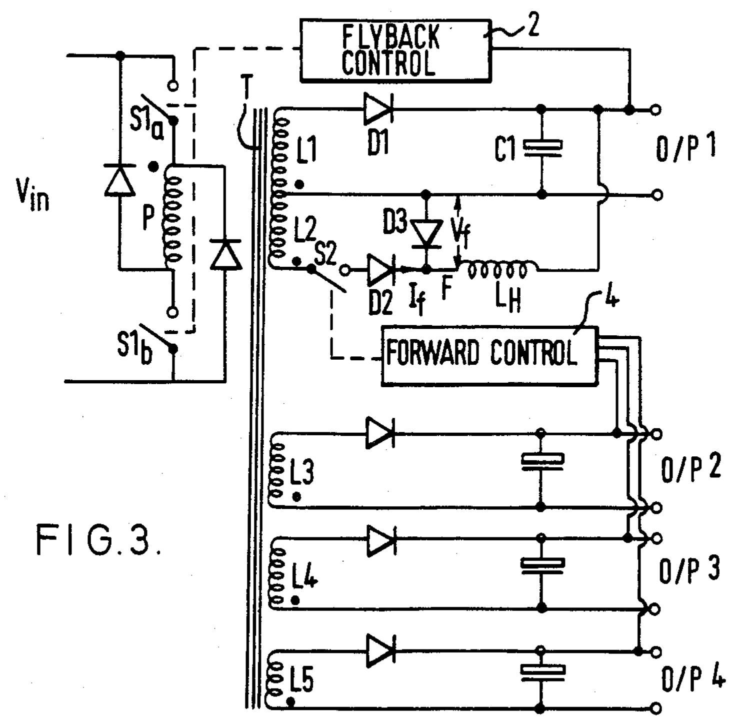

FIGS. 4(*a*) and (*b*) are somewhat idealised voltage and current waveforms respectively appearing across the primary P of transformer T. The waveforms of FIGS. 4(*a*) and (*b*) result from the action of switches S1*a* and S1*b* which are respectively closed and opened during periods $t_1$ and $t_2$. During period $t_2$, the voltage across primary winding P is a reflected voltage from the secondary circuits. During period $t_1$, the voltage across winding P, $V_p$, equals the impressed voltage $V_{in}$. During period $t_2$, the value of V initially clamps to $-V_{in}$ briefly and then to a lower level equal to the reflected voltage of the flyback outputs O/P2, O/P3 and O/P4.

The associated current waveform of FIG. 4(*b*) includes, during period $t_1$, a linear ramp of magnetising current which causes energy to be stored in transformer T. The stored energy is released to the flyback output during period $t_2$. Superimposed on this ramp after time delay $t_f$ is a current pedestal that is the reflected current from output O/P1.

Figure 3:
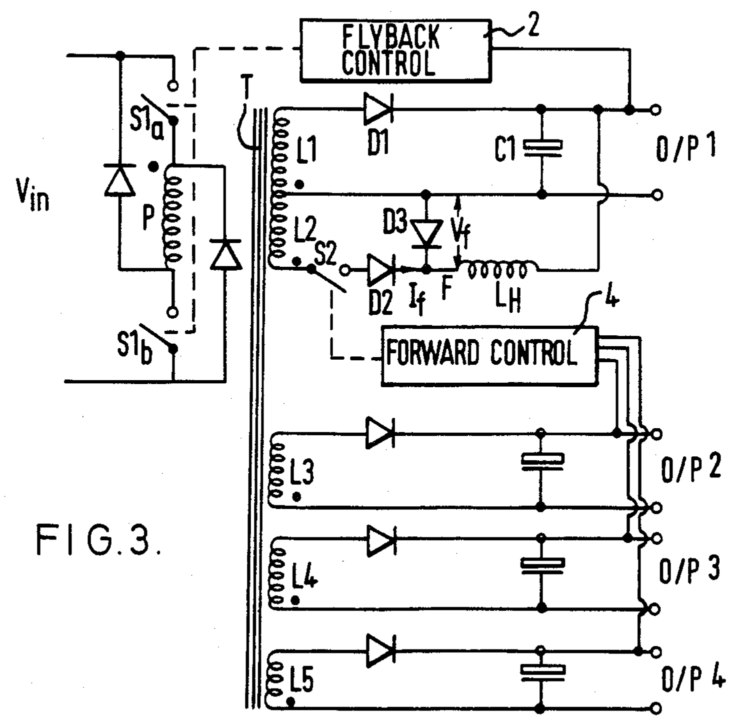

The dashed lines in FIG. 4(*c*) represent the voltage across winding $L_2$ as a replica, modified by turns ratio, of the voltage across winding P1. The application of voltage indicated by the dashed lines to output O/P1 is delayed by switch $S_2$ for a period $t_f$, so that the voltage $V_f$ at terminal F (FIG. 3) is as shown in full lines in FIG. 4(*c*). The corresponding current $I_f$ at terminal F is shown in FIG. 4(*d*). In FIGS. 4(*e*) and (*f*) are shown for completeness, the waveforms of the voltage across the flyback outputs O/P2, O/P3 and O/P4 and the current through the associated windings L3, L4 and L5. While complete energy transfer is shown for illustration purposes, this is not a requirement of the invention.

During, during $t_f$ (FIG. 4*c*)) (where $t_f \leqq t_1$) switch $S_2$ is open. Therefore output O/P1 acts in a forward conversion mode only during the period ($t_1$-$t_f$). Ignoring switching and resistive drop degraded regulation on outputs O/P3 and O/P4, and so forth.

The net result of the two control loops is to allow independent adjustment of forward conversion and flyback conversion, effectively producing the performance of two separate converters, but with only one transformer and primary circuit.

Figure 2:
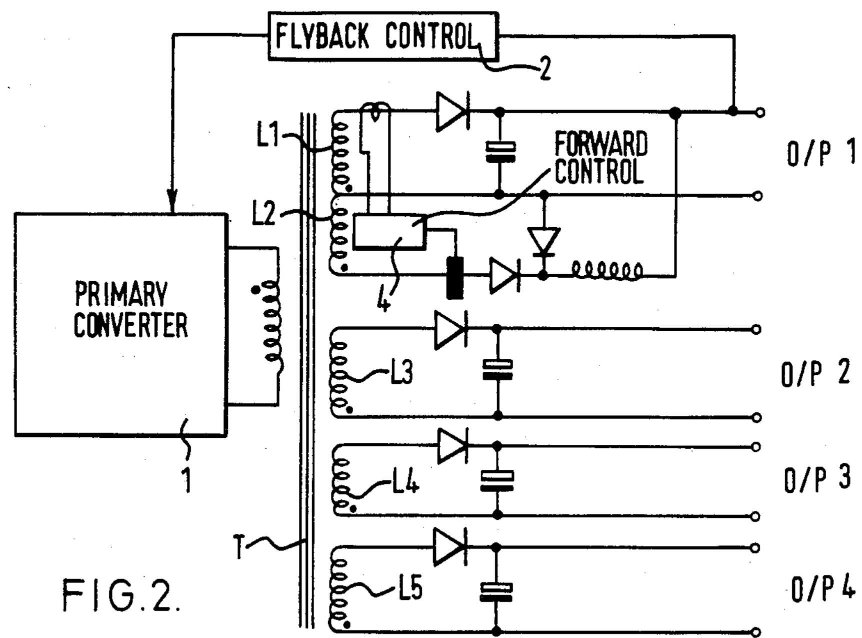

The power supply shown in FIG. 2 is an alternative form which achieves a similar effect. The action of the switches and the feedback control circuit is the same as previously described. The forward control circuit 4 however senses the integral of the current flowing in winding L1 (whose presence is mandatory in this arrangement). This is a measure of the flyback energy being contributed to output O/P1 by winding L1. By maintaining this constant through the action of the forward control circuit 4 and switch $S_2$, and by proper selection of the turns on windings L1, L3, L4, etc., such that $$\frac{\text{Voltage of output}}{\text{Turns of associated winding}}$$

is lower for output O/P1 than for the equivalent of any other flyback output, an improved regulation may be obtained from the flyback outputs.

We claim:

1. A switched-mode power supply having main load terminals and one or more auxiliary load terminals, wherein loads at the main and auxiliary load terminals are regulated both by controlling the stored energy of flyback conversion, and by controlling the direct energy of forward conversion, the power supply comprising a transformer having a primary winding, at least two main output windings and one or more other output windings, a primary converter associated with the primary winding, a forward conversion circuit associated with one of the main output windings for supplying the main load terminals, a flyback conversion circuit associated with the other of the main output windings for also supplying the main load terminals, one or more further flyback conversion circuits associated with the other output winding or windings for supplying the other load terminals, a forward control circuit connected to the forward conversion circuit for controlling the main load terminals in response to a signal derived from the flyback conversion circuit supplying the main load terminals, and a flyback control circuit connected to the primary converter and arranged to control the other load terminals in response to a signal derived from the main load terminals.

2. A switched-mode power supply as claimed in claim 1 wherein N sets of auxiliary load terminals are incontrolling the load at the main output terminals by flyback conversion, the transformer being coupled to the auxiliary load via the second output winding, so that the primary converter during the off periods responds to a voltage of the auxiliary load as reflected to the transformer via the second output winding, and a forward control circuit connected to be responsive to the voltage reflected to the transformer via the second output winding for controlling the load at the main output terminals by forward conversion, whereby the load at the main output terminals is controlled by both flyback and forward conversion.

4. A switched-mode supply according to claim 3, wherein the flyback control circuit is also arranged to control the second output winding by flyback conversion.

5. A switched-mode power supply according to claim 3, wherein the forward control circuit is supplied by the second output winding.

6. A switched-mode power supply according to claim 3, wherein the forward control circuit is supplied by the first output winding under flyback control.

7. A switched-mode power supply according to claim 3, which includes N of the auxiliary output windings, where N is an integer greater than 1, and the forward control circuit is supplied by a plurality of the auxiliary output windings.

8. A power supply circuit for supplying DC current to a pair of main load terminals and to a pair of auxiliary load terminals comprising a primary variable duty cycle switching converter for supplying variable duty cycle current pulses to a primary winding of a transformer including main secondary winding means for supplying current to the main load terminals and auxiliary secondary winding means for supplying current to the auxiliary load terminals, first means for converting AC to DC connected between the main secondary winding means and the main load terminals, second means for converting AC to DC connected between the auxiliary secondary winding means and the auxiliary load terminals, flyback control means responsive to the DC voltage at the main load terminals for controlling the duty cycle of the current supplied by the primary converter to the primary winding, the transformer storing energy while current is supplied to the transformer by the primary winding, the second AC to DC converting means being coupled via the auxiliary secondary winding means to the transformer so the stored energy is supplied to the auxiliary load terminals via the auxiliary secondary winding means while no substantial current is supplied to the transformer by the primary converter, and forward control means responsive to the value of a parameter resulting from current flowing in one of said converting means while no substantial current is supplied to the transformer by the primary converter for controlling the duration of current flow from the main secondary winding means to the first AC to DC converting means while current is supplied to the transformer by the primary converter.

9. A power supply circuit according to claim 8, wherein the variable duty cycle current while flowing in the primary winding includes a ramping segment followed by a pedestal segment, the pedestal segment being reflected current from the main load terminals, and the forward control means includes switch means responsive to said parameter for coupling current from the main secondary winding means to the first AC to DC converting means only during the ramping and/or pedestal segments.

10. A power supply circuit according to claim 8, wherein the duration controlling parameter is indicative of the integral of a current component supplied by the main secondary winding means to the first AC to DC converting means while no substantial current is supplied to the transformer by the primary converter.

11. A power supply circuit according to claim 10, wherein the main secondary winding means includes first and second winding segments, the first converting means including: rectifier means connected between the first winding segment and the main load terminals for supplying DC voltage of a predetermined polarity to the main load terminals while no substantial current is supplied to the transformer by the primary converter; first and second diodes, inductor means and switch means connected between the second segment and the main load terminals so that (a) when the switch means is closed and while current is supplied to the transformer by the primary converter current flows in a first direction to the main load terminals from the second segment via the switch means, the first diode and the inductor means and (b) when the switch means is open current continues to flow in said first direction to the main load terminals from the inductor means via the second diode and negligible current flows from the second segment to the first diode, the first direction of current flow aiding the voltage of predetermined polarity supplied to the main load terminals, the duration of the second switch closing being responsive to the integral of current supplied by the main secondary winding means to the rectifier means.

12. A power supply circuit according to claim 8, wherein the duration controlling parameter is indicative of the DC voltage at the auxiliary load terminals.

13. A power supply circuit according to claim 12, wherein the main secondary winding means includes first and second winding segments, the first converting means including: rectifier means connected between the first winding segment and the main load terminals for supplying DC voltage of a predetermined polarity to the main load terminals while no substantial current is supplied to the transformer by the primary converter; first and second diodes, inductor means and switch means connected between the second segment and the main load terminals so that (a) when the switch means is closed and while current is supplied to the transformer by the primary converter current flows in a first direction to the main load terminals from the second segment via the switch means, the first diode and the inductor means and (b) when the switch means is open current continues to flow in said first direction to the main load terminals from the inductor means via the second diode and negligible current flows from the second segment to the first diode, the first direction of current flow aiding the voltage of predetermined polarity supplied to the main load terminals, the duration of the second switch closing being responsive to DC voltage at the auxiliary load terminals.

14. A power supply circuit according to claim 8, wherein N pairs of auxiliary load terminals are provided, where N is an integer greater than 1, and the duration controlling parameter is indicative of the average value of the DC voltages at a plurality of said N pairs of auxiliary load terminals.

15. A power supply circuit according to claim 14, wherein the main secondary winding means includes